Jan. 13, 1953    E. G. PRECHEL    2,625,002
AUTOMATIC SELF-DUMPING BALE CARRIER
Filed July 12, 1950    2 SHEETS—SHEET 1
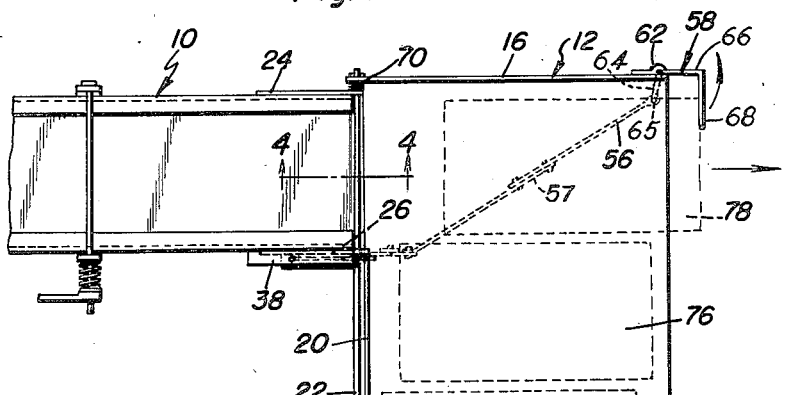
Fig. 1
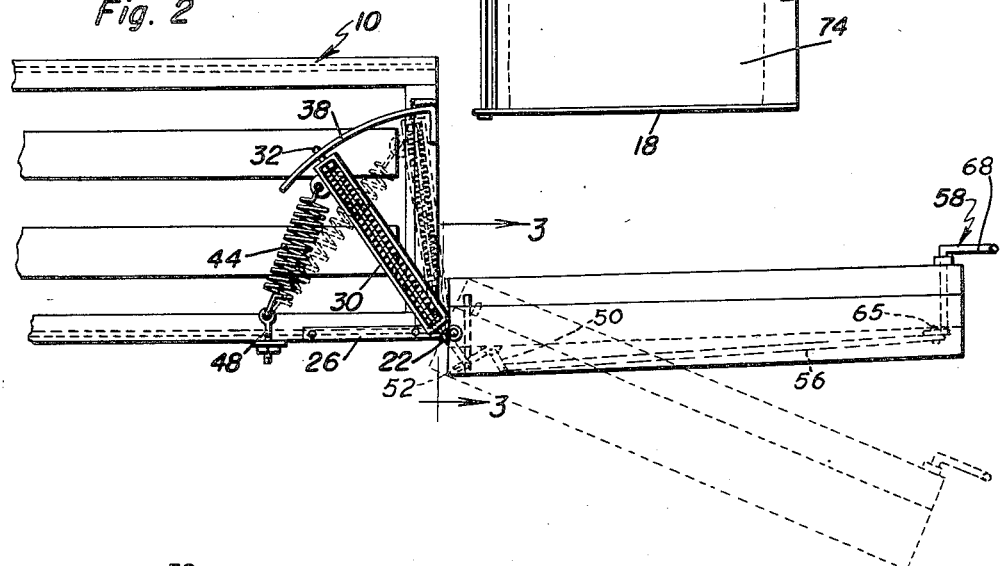
Fig. 2
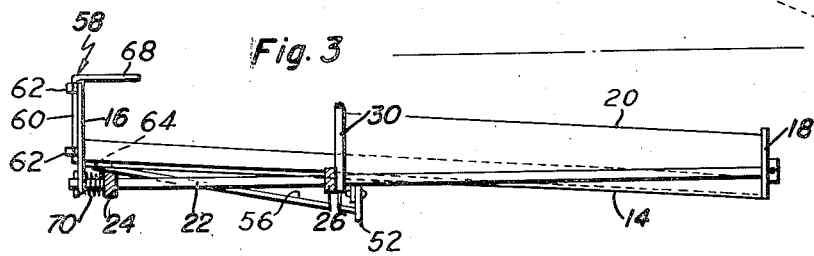
Fig. 3
Fig. 8
Elmer G. Prechel
INVENTOR.
BY Clarence A. O'Brien
and Harvey B. Jacobson
Attorneys

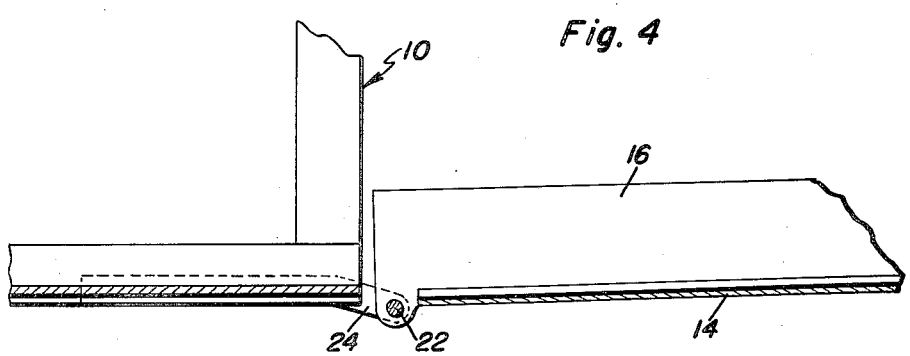
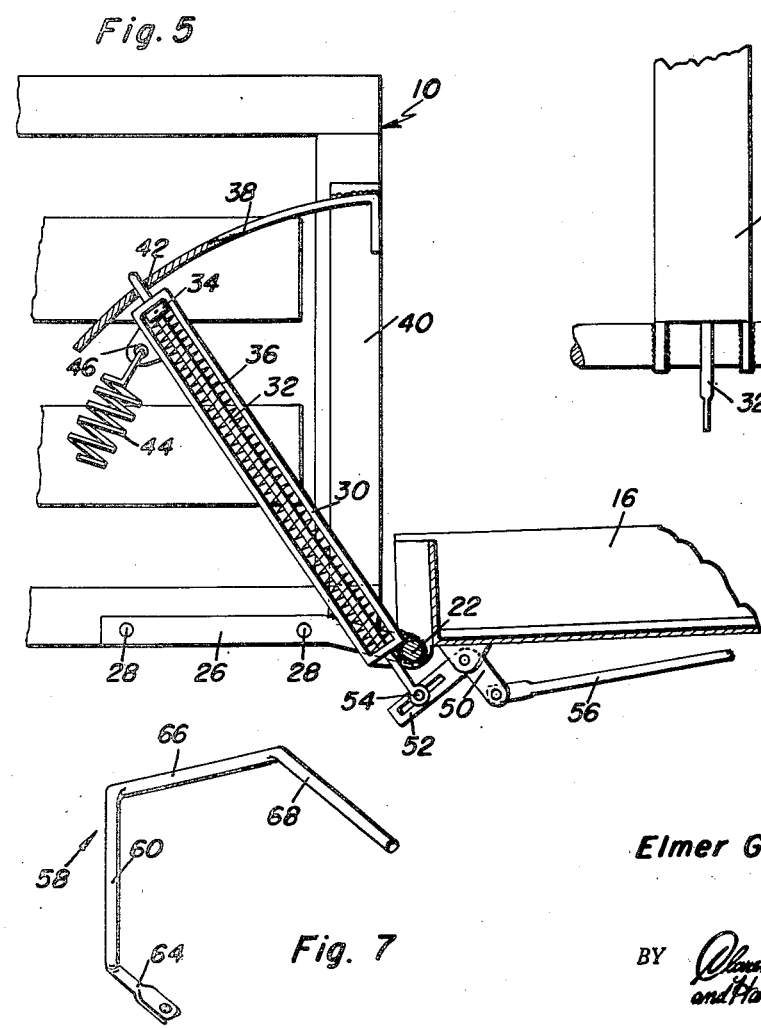
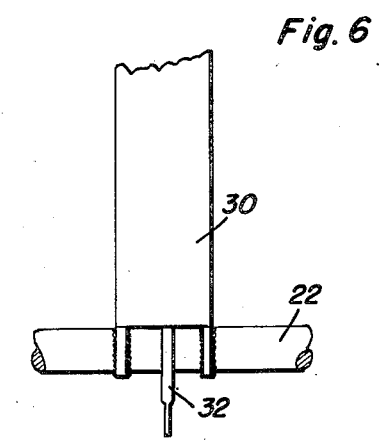

Patented Jan. 13, 1953

2,625,002

UNITED STATES PATENT OFFICE 2,625,002

AUTOMATIC SELF-DUMPING BALE CARRIER

Elmer G. Prechel, Springfield, Minn.

Application July 12, 1950, Serial No. 173,287

6 Claims. (Cl. 56—476)

This invention relates to new and useful improvements in self-dumping bale carriers.

The primary object of this invention is to provide a baling machine with means to receive and accumulate a number of bales before depositing the same upon the ground, so that the bales will be in spaced groups along the path of travel of the baling machine rather than spaced individually to make easier the task of subsequently gathering the same.

Another important object of the present invention is to provide a device of this character which will deposit the bales upon the ground in response to a bale carried thereby operating a trigger and release mechanism, and which bale will be the latter bale of a series received by the device during a single cycle of operation.

Another important object of this invention is to provide a device of this character which will be entirely automatic in operation, that is, it will return to a bale receiving position for a repeat cycle upon dumping its contents.

Still another object of this invention is to provide a device of this character which will be positively retained in its receiving position until actuated by a bale to deposit the bales upon the ground by their own weight causing vertical swinging movement of the receiver.

A meritorious feature of the present invention resides in the inclination of the bale supporting platform so that a number of bales are received thereon before the trigger is actuated.

Still another important feature of the present invention resides in the latch housing constituting a lever arm for raising the supporting platform to the receiving position.

A final important feature to be specifically enumerated herein resides in the latch means and the means for actuating the same.

These, together with various ancillary features and objects of the invention which will later become apparent as the following description proceeds, are attained by the present invention, a preferred embodiment of which has been illustrated by way of example only in the accompanying drawings, wherein:

Figure 1 is a top plan view of the present invention showing the same attached to a baling machine, partially shown, this view illustrating the manner in which the bales are received on the platform and how one of the bales engages a trigger;

Figure 2 is an enlarged side elevational view of the present invention, the platform being shown in a dumping position in dotted outline;

Figure 3 is a vertical sectional view of the present invention taken along the plane of the section line 3—3 of Figure 2, this view illustrating particularly the inclination of the supporting platform and the means provided for making the attachment conform to the variations in width of the baling chamber;

Figure 4 is an enlarged fragmentary vertical sectional view taken upon the plane of section line 4—4 of Figure 1;

Figure 5 is an enlarged side elevational view of the latch mechanism and the actuating means therefor, portions of the latch keeper and the supporting platform being shown in vertical section;

Figure 6 is a fragmentary view of the manner in which the latch housing is secured to the shaft;

Figure 7 is a perspective view of the trigger; and

Figure 8 is an enlarged top elevational view of the latch keeper.

Reference is now made more specifically to the accompanying drawings, wherein like numerals designate similar parts throughout the various views, and in which the baling chamber of a conventional baling machine is designated generally at 10.

The present invention designated generally at 12 includes a supporting platform 14 having upstanding side walls 16 and 18 and a forward upstanding wall 20 extending partially across the forward edge of the platform 14 so that bales may slide freely from the baling chamber on to the platform 14.

As clearly shown in Figures 3 and 4, the supporting platform 14 normally has its surface inclined sidewardly and downwardly, and fixedly secured to the forwardly extending portions of the side walls 16 and 18 is a shaft 22 by which the supporting platform is pivotally secured to the baling machine 10 for vertical swinging movement.

A pair of brackets 24 and 26 are suitably secured as by fasteners 28 to the opposite sides of the rear of the baling machine 10, which brackets include rearwardly extending portions in which the shaft 22 is journaled as shown in Figures 4 and 5.

In order to latch the platform in the bale receiving position shown in full lines in Figure 2, a latch housing 30 is fixedly secured to the shaft 22 as clearly shown in Figures 5 and 6, so that swinging movement of the latch housing 30 about the shaft 22 as an axis causes vertical swinging movement of the platform 14, since the latter is fixedly secured to the shaft 22.

As best shown in Figure 5, a latch bar 32 is reciprocal through the opposite closed ends of the housing 30, and a collar 34 is secured to the latch bar 32 within the housing 30, and a coiled compression spring 36 surrounds the bar 32 and is seated between the collar 34 and the lower closed end of the housing 30 to resiliently urge the latch bar 32 upwardly. An arcuate latch keeper 38 is carried by a bracket 40 that extends upwardly from the bracket 26, and as clearly shown in Figure 5, the latch keeper 38 is positioned with respect to the latch housing 30 so that the upper end of the latch bar resiliently bears against the concaved lower surface of the latch keeper 38 during swinging movement of the latch housing 30. The latch keeper 38 is provided with an opening 42 disposed in the path of travel of the latch bar 32, so that when the latch housing 30 is in the position supporting the platform 14 in the bale receiving position, that the latch bar 32 will enter the opening 42 to latch the latch housing 30 against movement.

Means is provided to resiliently urge the platform 14 to the bale receiving position which includes a tension spring 44 having one end secured to a lug 46 projecting from the upper end of the latch housing 30, and having its lower end suitably secured to an eye bolt 48 suitably mounted upon the baling machine 10. It will thus be seen that means are provided for resiliently urging the platform 14 into its bale receiving position, and that when the platform is in such a position that the same is latched against downward swinging movement.

Means is provided for releasing the latch bar 32 from the latch keeper 38, so that bales on the platform 14 will overcome the spring 44 to be dumped therefrom. These means take the form of a bellcrank 50 pivotally mounted upon the underside of the platform 14, and one arm of which is slotted at 52 to slidingly receive a pin 54 carried at the lower end of the latch bar 32, the arrangement being such that actuation of the bellcrank 50 in the counter-clockwise direction as shown in Figure 5, actuates the latch bar 32 to release the same from the latch keeper 38. Conversely, the latch bar 32, through the action of the spring 36 tends to rotate the bellcrank 50 to the position shown in Figure 5.

In order to actuate the bellcrank 50, the other leg is pivoted to an actuating rod 56, which rod 56 extends below the platform 14 to a position adjacent the trailing edge of the platform 14 as best shown in Figure 1. The rod 56 is shown as being of two-piece construction suitably secured as at 57. A trigger designated generally at 58 includes a shaft 60 journaled in loops 62 formed on the side wall 16 adjacent the trailing edge of the platform for oscillation about a vertical axis. The lower end of the shaft 60 is provided with a crank arm 64 which has pivotal connection to the rod 56 at 65, and the upper end of the shaft 60 is provided with a rearwardly extending arm 66 that terminates in a laterally extending projection 68 that is adapted to be engaged by a bale on the platform 14.

As best shown in Figures 3, means is provided to allow for transverse expansion and contraction of the baling machine 10, which means includes a spring 70 disposed about the shaft 22 and seated between the forward projecting end of the side wall 16 and the bracket 24 in which the shaft 22 is journaled.

The arrangement of the brackets 24 and 26, the forward end of the wall 16, the housing 30, and the spring 70 is such that the brackets are retained on the shaft 22 between the wall 16 and the housing 30 with the spring permitting sliding movement of the bracket 24 on the shaft to compensate for expansion of the baling chamber. Obviously, if desired, the brackets 24 and 26 may be dispensed with and the shaft 22 simply journaled through opposite side walls of the baling chamber with spring 70 in the same relative position thereto. Thus it will be seen that the subject matter of this invention may be employed in conjunction with any type of square baler, of either the right or left hand type.

It is believed that the operation of the attachment will be readily understood. As bales are discharged rearwardly from the baling machine 10 in the conventional manner, they are received on the platform 14, and by virtue of the inclination of the platform 14 the first bale received thereon slides to the position designated at 74, while the second bale received thereon slides to the position designated at 76, and finally the bale designated at 78 is forced directly rearwardly, since the space on the lower part of the platform is already occupied, so that the same strikes the trigger arm 68 to swing the crank arm 64 about the shaft 60 as an axis, thus causing the rod 56 to actuate the bellcrank 50 to release the latch bar 32. Upon the latch bar 32 being released, the bales on the platform cause the platform to swing downwardly so that they all slide rearwardly therefrom, whereupon the platform 14 is raised by the action of the spring 44 until the latch bar 32 again latches the platform in the raised position, it being noted that the spring 36 in addition to causing the latch bar 32 to latch also through the bellcrank 50 and the rod 56 oscillate the trigger 58 to a position for a repeat operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. An attachment for baling machines comprising a bale supporting platform, means for mounting the platform on a baling machine for vertical swinging movement and in a position to receive bales therefrom, means for yieldingly urging the platform towards a raised position to support bales received thereon, latch means responsive to the platform being in the raised position to prevent downward swinging movement of the platform, said platform having a vertically inclined surface when in the raised position that is inclined in a direction transverse to the direction of vertical swinging movement of the same, and latch releasing means engageable by a bale on the platform for rendering said last means ineffective, whereby the platform swings downwardly under the weight of a bale thereon against the first means to be discharged therefrom, said last-mentioned means being disposed adjacent the upper edge of the inclined surface.

2. A dumping bale carrier comprising a pair of brackets adapted to be secured to a baling machine, a bale supporting platform pivotally connected to the brackets for vertical swinging movement, a lever arm in fixed relation to the platform for raising the platform, resilient means connected to the arm for yieldingly urging the platform to a raised position, a latch keeper carried by one of the brackets, a latch bar carried by the lever arm, a spring urging the bar towards the keeper, said bar and keeper being in relative latching position when the platform is in raised position, and means for operating against said spring to release said latch.

3. A dumping bale carrier comprising a pair of brackets adapted to be secured to a baling machine, a bale supporting platform pivotally connected to the brackets for vertical swinging movement and in a position to receive bales therefrom, a lever arm in fixed relation to the platform for raising the platform, resilient means connected to the arm for yieldingly urging the platform to a raised position, said platform when in raised position having a surface inclined in a direction transverse to the direction of vertical swinging movement, a latch keeper carried by one of the brackets, a latch bar carried by the lever arm, a spring urging the bar towards the keeper, said bar and keeper being in relative latching position when the platform is in raised position, and means for operating against said spring to release said latch, said last means being carried by the platform.

4. The combination of claim 3, wherein said last means includes a trigger engageable by a bale on the platform.

5. An attachment for baling machines comprising a bale supporting platform, means for mounting the platform on a baling machine for vertical swinging movement and in a position to receive bales therefrom, means for yieldingly urging the platform to a raised position to support bales received thereon, latch means responsive to the platform being in the raised position to prevent downward swinging movement of the platform, and latch releasing means engageable by a bale on the platform for rendering said last means ineffective, said last means including a shaft rockably mounted on said platform, an arm extending from said shaft operatively connected to said penultimate means, and a trigger arm on said shaft for imparting rotation to said shaft.

6. A dumping bale carrier comprising a pair of brackets adapted to be secured to a baling machine, a bale supporting platform pivotally connected to the brackets for vertical swinging movement, a lever arm in fixed relation to the platform for raising the platform, resilient means connected to the arm for yieldingly urging the platform to a raised position, a latch keeper carried by one of the brackets, a latch bar carried by the lever arm, a spring urging the bar towards the keeper, said bar and keeper being in relative latching position when the platform is in raised position, and means for operating against said spring consisting of a shaft rockably mounted on said platform, an arm on said shaft operatively connected to said latch bar, and a trigger arm on said shaft.

ELMER G. PRECHEL.

REFERENCES CITED

The following references are of record in the file of this patent:

UNITED STATES PATENTS

| Number | Name | Date |
|---|---|---|
| 391,857 | Perry | Oct. 30, 1888 |
| 614,758 | Pfeiffer | Nov. 22, 1898 |
| 1,256,410 | Whitlow | Feb. 12, 1918 |
| 1,588,681 | Haney | June 15, 1926 |
| 2,152,644 | Hiser | Apr. 4, 1939 |
| 2,268,713 | Luti | Jan. 6, 1942 |
| 2,327,264 | Hendrickson | Aug. 17, 1943 |
| 2,390,306 | Hunziker | Dec. 4, 1945 |
| 2,412,711 | Brewer | Dec. 17, 1946 |
| 2,453,384 | Renken | Nov. 9, 1948 |
| 2,531,560 | De Wall | Nov. 28, 1950 |